United States Patent [19]

Ferm et al.

[11] 4,198,245

[45] Apr. 15, 1980

[54] PROCESS FOR PRODUCING CONCRETE STRUCTURES OF HIGH STRENGTH

[75] Inventors: Richard L. Ferm; Robert W. Campbell, both of Lafayette, Calif.

[73] Assignee: Chevron Research Company, San Francisco, Calif.

[21] Appl. No.: 938,666

[22] Filed: Aug. 31, 1978

[51] Int. Cl.² ............................................. C04B 7/02
[52] U.S. Cl. ...................................... 106/97; 264/333
[58] Field of Search ............................ 106/90, 89, 95; 264/333

[56] References Cited

U.S. PATENT DOCUMENTS

| | | | |
|---|---|---|---|
| 2,820,713 | 1/1958 | Wagner | 106/93 |
| 2,962,467 | 11/1960 | Wagner et al. | 106/90 |
| 3,198,644 | 8/1965 | Simonson | 106/93 |
| 3,972,969 | 8/1976 | Rio et al. | 264/333 |

*Primary Examiner*—Robert F. White
*Assistant Examiner*—John A. Parrish
*Attorney, Agent, or Firm*—D. A. Newell

[57] ABSTRACT

The strength of portland cement concrete structures which incorporate alkali metal or alkaline earth polysulfides is increased by heating the structures at temperatures above 110° C.

9 Claims, No Drawings

PROCESS FOR PRODUCING CONCRETE STRUCTURES OF HIGH STRENGTH

BACKGROUND OF THE INVENTION

1. Field of the Invention

This application relates to a process for producing portland cement concrete of increased strength and to the structures produced by the process.

Portland cement concrete has become the world's largest bulk building material. The concrete comprises an admixture of portland cement with sand and aggregate (gravel or crushed stone). It is generally formed by mixing portland cement, water, sand and gravel or crushed stone, and allowing the mixture to harden to form a dense structure. The character of the "paste" mixture of water and cement is generally held to determine the important engineering properties of the concrete.

Construction concrete is generally formulated to contain from about 5 to 30 weight percent cement based upon the dry weight of materials. Generally, higher cement content (in the upper range of the usual content) produces concrete of higher strength.

Recently, shortages of cement in many parts of the world make particularly attractive the prospects of supplying concrete of low cement content which has high strength.

2. Description of the Prior Art

Polymer cements and polymer-impregnated concretes are known. The former usually contain a latex such as polyvinyl chloride, polyvinyl acetate, acrylonitrite-butadiene-styrene, etc., or an acrylic in solid or liquid form.

U.S. Pat. No. 2,820,713 discloses mortar compositions containing minor amounts of methyl cellulose and alkaline earth polysulfides and/or bunte salts as adhesion improvers.

U.S. Pat. Nos. 2,962,467 and 3,198,644 disclose similar mortar compositions.

"Characteristics of Portland Cement from the GypsumSulfuric Acid Process" by Fredrich Wolfe and Joachim Hille (Silikattechnik, 1967, 1812), pages 55-57, discusses the effect on certain portland cements by the addition of calcium sulfide ($Ca_2S$).

SUMMARY OF THE INVENTION

It has now been found that polysulfide-containing portland cement concrete structures of improved strength can be produced by heating the structures at temperatures above about 110° C.

DESCRIPTION OF THE PREFERRED EMBODIMENTS

A companion application Pending case Ser. No. 938,668, discloses and claims portland concrete compositions containing low cement contents, i.e., from about 6 to 15% by weight cement relative to aggregate. The compositions contain from about 1.5 to 6.0 weight percent of alkali metal or alkaline earth metal polysulfide, preferably calcium polysulfide.

The concrete article containing the polysulfide will be heated at a temperature in the range of 110° to 180° C., preferably 115° to 160° C., for a time of at least 0.1 hour, preferably 0.25 to 24 hours, and more preferably from about 0.5 to 4 hours.

The concrete composition will contain aggregate, and based on the aggregate from about 6 to 25 weight percent portland cement and from about 1.5 to 20 weight percent alkali metal or alkaline earth metal polysulfide.

The alkali metal or alkaline earth metal polysulfide, preferably calcium polysulfide, is blended with the cement and aggregate at the time of mixing. The calcium polysulfides are articles of commerce and are conventionally prepared by the reaction of sulfur with lime water. Other polysulfides such as barium polysulfide are produced in a similar manner. Their preparation is described on page 63 of "A Text-Book of Organic Chemistry", Vol. III, Part I, edited by J. Newton Friend, Charles Griffin and Co., London, 1925. For agricultural purposes, they are conventionally sold as concentrated aqueous solutions, e.g, about 30 weight percent $CaS_x$.

Thus, in preparing the concrete, substitution of a calcium polysulfide ($CaS_x$) solution containing the appropriate amount of water for the desired water/cement ratio in the concrete will be the most suitable method. Otherwise, preparation of the concrete mix is by conventional means. There are several methods for determining proper water/cement ratios, etc. These are described in "Portland Cement and Asphalt Concretes", Thomas D. Larson, McGraw-Hill Book Co., Inc. (New York, 1963), pages 85-99.

The ratio of cement to polysulfide in the composition will preferably be in the range of about 4:1 to about 2:1.

The aggregates used in preparing the concrete are preferably those defined in ANSI/ASTM-C-33-77 for fine and coarse aggregates. The ratio of coarse-to-fine aggregate will range from about 1:2 to 7:1, preferably 1:1 to 4:1.

The concrete article may be heated soon after initial set, but it is preferred that a normal curing period of at least 7, and preferably at least 20, days be employed before heating.

Heating of the structure may be accomplished by any suitable means. Large articles thus may be heated by the use of radiant heat, or by direct application of flame to the surface, etc. Smaller articles, such as building blocks, stepping stones, pipe sections, etc., can be conveniently heated in ovens.

The process by which the concrete articles are strengthened is not exactly understood, as cross-linking of polysulfides is not believed to occur, so some interaction with the portland cement or change in the sulfur structure is probably involved.

Strength development is complete after heating and cooling, assuming that a sufficient curing period is provided before the heating treatment.

In the case of large structures, where heating of the entire bulk is difficult or impossible, application of heat to the exterior will result in heating and consequent strengthening of the heated layer. This can be quite beneficial in many applications where stress is placed primarily on the outer parts of the structures.

EXAMPLES

The following examples illustrate the invention. The examples are illustrative only and are non-limiting.

EXAMPLE 1

A mix was prepared with a commercially available "ready mix" concrete, containing about 3.2% calcium polysulfide relative to aggregate. The ready mix contained about 10.1% by weight Type I portland cement (based on aggregate). The ready mix was screened, and the following proportions of materials were obtained. The cement, of course, was included in the screening, accounting for the large amount of material passing 100 mesh.

TABLE I

Screen Analysis of Ready Mix Concrete

| Mesh Size | Wt. % Retained |
|---|---|
| 1" | 17.8 |
| 10 | 14.7 |
| 20 | 24.4 |
| 40 | 15.1 |
| 80 | 11.3 |
| 100 | 0.1 |
| Passing 100 | 16.5 |

The mixes were prepared by mixing 91% weight ready mix with 9% of an aqueous 29% $CaS_x$ solution.

The concrete was molded into 2-inch (5.1 cm) cubes. The cubes were wet-cured for one week at room temperature. Three of the cubes were placed in an oven and heated for two hours at 250° F. (121° C.). The cubes were removed from the oven and allowed to cool overnight. The three heated cubes and three unheated cubes were broken on a Baldwin press at a crushing rate of 0.5 in (1.27 cm) per minute, giving an average compressive strength in psi of 3366 for the headed samples and 2050 for the unheated samples. Unheated samples with this quantity of polysulfide develop compressive strengths of about 2700 psi after 28 days wet cure.

These data show that a significant improvement in strength can be achieved by the process of this invention relative to the unheated polysulfide-containing compositions.

Although many specific embodiments of the invention have been described in detail, it should be understood that the invention is to be given the broadest possible interpretation within the terms of the following claims.

What is claimed is:

1. A process for increasing the strength of portland cement concrete structures, said concrete comprising aggregate, from 6 to 25% by weight, based upon aggregate, of portland cement and from 1.5 to 20% by weight of alkali metal or alkaline earth metal polysulfide, comprising heating said structure after initial set at a temperature in the range of 110° to 180° C. for a period of at least 0.1 hour.

2. The process of claim 1 in which the heating is carried out for from about 0.25 to 24 hours.

3. The process of claim 1 in which the polysulfide is calcium polysulfide.

4. The process of claim 1 in which the structure is heated for 0.5 to 4 hours.

5. A portland cement concrete structure of improved strength produced by the process of claim 1 or 3.

6. A process as in claim 1 wherein said heating is effected after a curing period of at least 6 days.

7. A process as in claim 1 wherein said concrete is prepared using a mix consisting essentially of Portland cement, calcium polysulfide, aggregate and water.

8. A process as in claim 1 wherein said concrete is prepared using a mix free of Bunte salts.

9. A process as in claim 1 wherein said heating is at a temperature in the range of from about 115° to 160° C. for a period in the range of from about 0.5 to 4 hours.

* * * * *